United States Patent [19]
Key

[11] 3,923,334
[45] Dec. 2, 1975

[54] VEHICLE BED COVER ASSEMBLY

[76] Inventor: Hugh L. Key, 181-A Broadmoor Lane, Winston-Salem, N.C. 27104

[22] Filed: Mar. 22, 1974

[21] Appl. No.: 448,915

[52] U.S. Cl. .................. 296/10; 135/1 A; 296/100
[51] Int. Cl.² .......................................... B60P 3/42
[58] Field of Search ........ 296/10, 23 R, 100, 137 R, 296/137 B, 76, 99; 52/66; 135/1 A, 3 A; 49/463, 465, 394

[56] References Cited
UNITED STATES PATENTS

| | | | |
|---|---|---|---|
| 577,838 | 3/1897 | Cowah | 296/76 |
| 3,021,852 | 2/1962 | Hoffman | 135/1 A |
| 3,209,373 | 10/1965 | Meredith et al. | 52/66 |
| 3,255,466 | 6/1966 | Weizer | 135/1 A |
| 3,489,456 | 1/1970 | Klanke | 296/100 |
| 3,514,152 | 9/1968 | Hermon | 296/137 B |
| 3,572,821 | 3/1971 | Antwerp | 296/137 B |
| 3,704,039 | 11/1972 | Dean | 296/137 B |

*Primary Examiner*—Robert J. Spar
*Assistant Examiner*—Gary Auton

[57] ABSTRACT

A lightweight, low profile cover assembly for the load bed of a pickup truck includes frame members adjustable for positioning upon trucks having varying width load beds and a cover attached to the frame members and displaceable between an upper, open position and a lower, closed position. Rollers upon the frame assembly facilitate rapid placement of the assembly upon a truck and detachment from the truck. The frame members are conveniently releasably clamped to the vehicle and the cover assembly is provided with a mechanism for facilitating locking of the cover, in a closed position, to the frame members and preventing opening of the vehicle tailgate.

7 Claims, 17 Drawing Figures

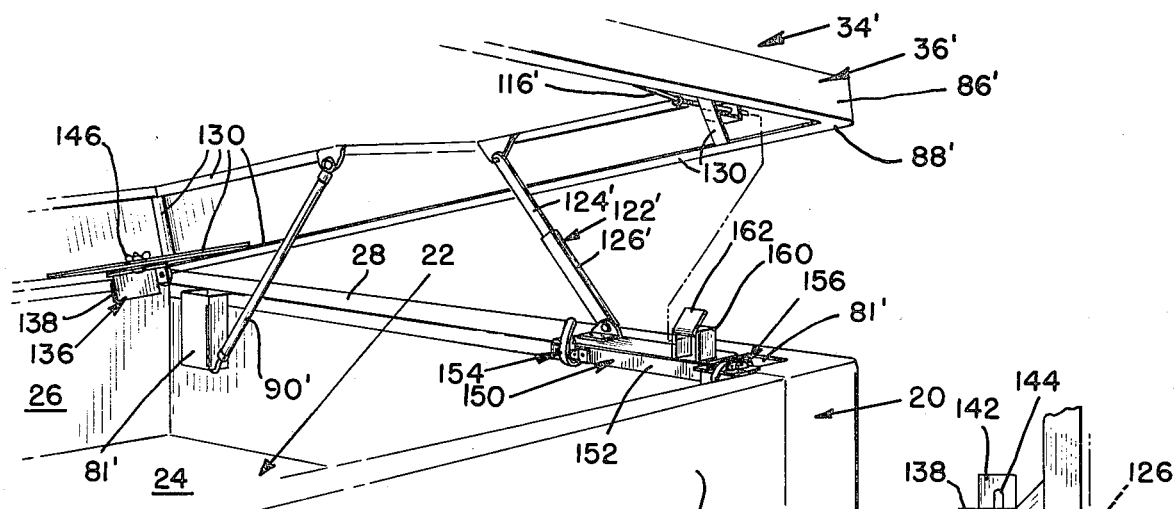
FIG. 13
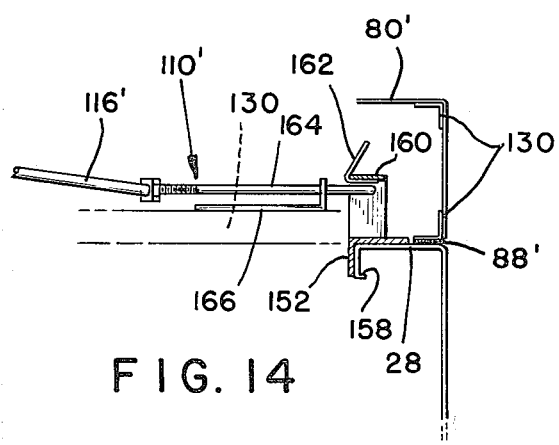
FIG. 14
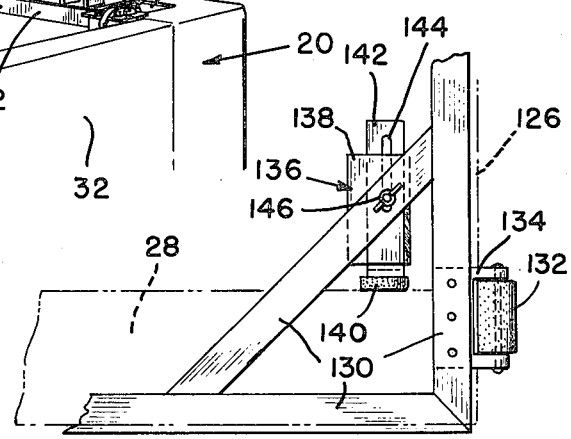
FIG. 15
FIG. 16
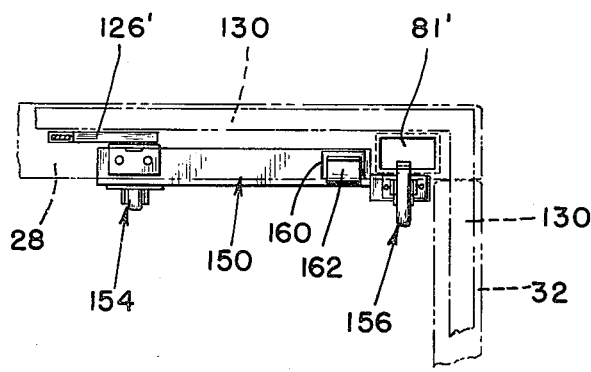
FIG. 17

3,923,334

VEHICLE BED COVER ASSEMBLY

BRIEF SUMMARY AND OBJECTS OF THE INVENTION

This invention relates to a new and improved cover assembly for the load carrying compartment of vehicles, for example, such as pickup trucks. Such vehicles normally include a load-carrying bed defined by a generally horizontal floor, stationary front and side walls and a rear wall which may be pivotable between open and closed positions.

Structures are known for covering the load bed of a vehicle as shown, for example, by U.S. Pat. Nos. 3,489,456; 3,420,570; 3,180,674 and 3,762,762. The covers serve to protect articles or a load carried by the vehicle from rain, snow, etc. and also tend to reduce theft.

Generally, each of such covers must be constructed for a particular vehicle since the width of the load bed varies considerably from manufacturer to manufacturer. Further, such vehicles normally must be modified or altered to accommodate means for securing the covers upon the vehicles.

The cover assembly of the present invention is constructed to be mounted upon all or substantially all pickup trucks even though the width between the load bed side walls and contour of the side walls may vary, depending upon the manufacturer. However, the length of the load bed for such vehicles would be substantially the same, for example, 8 ½ feet in length. A cover assembly of a different length would be provided for short bed pickup trucks of American manufacturers as well as imported pickup trucks.

The low profile, lightweight, cover assembly extends a limited distance above the side walls defining the load bed in a manner so as not to obstruct the vision of the vehicle operator and passengers. The cover eliminates the top heavy feeling of conventional covers which protrude vertically above the rear window and/or cab of the pickup truck.

The cover assembly of the present invention is adapted for use on pickup trucks having load beds of varying widths without altering or modifying the vehicle for securing the cover thereto. Rollers are provided on the forward end of the cover assembly for facilitating mounting and removal of the assembly. A locking arrangement including a lock member is provided at the rearward end of the cover assembly to retain the cover in a closed condition and to prevent pivoting of the vehicle tailgate to an open position until the cover is raised.

One of the primary objects of the invention is the provision of a new and improved cover assembly for mounting upon vehicles to cover load beds of varying widths.

Another object of the invention is the provision of a lightweight, low profile cover assembly adapted to be readily and conveniently mounted upon and removed from a vehicle.

A further object of the invention is the provision of a pickup truck load bed cover adapted to be pivoted about the forward end portion for displacement between a weather-tight, closed position and a raised position for providing access to the entire load bed.

Still another object of the invention is the provision of a new and improved cover assembly adapted to be mounted upon a vehicle without modification thereto and which can be locked in a closed position thereby preventing opening of the vehicle tailgate.

Other objects and advantages of the invention will become apparent when considered in view of the following detailed description.

DESCRIPTION OF THE DRAWING

FIG. 13 is a fragmentary, perspective view of a modified cover assembly positioned in an open position upon a pickup truck;

FIG. 14 is an enlarged, fragmentary view of the right rear corner of the cover assembly of FIG. 13 illustrating the mechanism for locking the cover to the frame members;

FIG. 15 is an enlarged, fragmentary, top plan view of the right forward corner of the cover assembly of FIG. 13 illustrating the manner of adjustably positioning the forward end of the cover assembly upon a vehicle;

FIG. 16 is a right side elevational view of the cover assembly of FIG. 15; and

FIG. 17 is a top plan view of a frame assembly clamped to a rear side portion of a pickup truck.

DETAILED DESCRIPTION OF THE INVENTION

Figure 1:
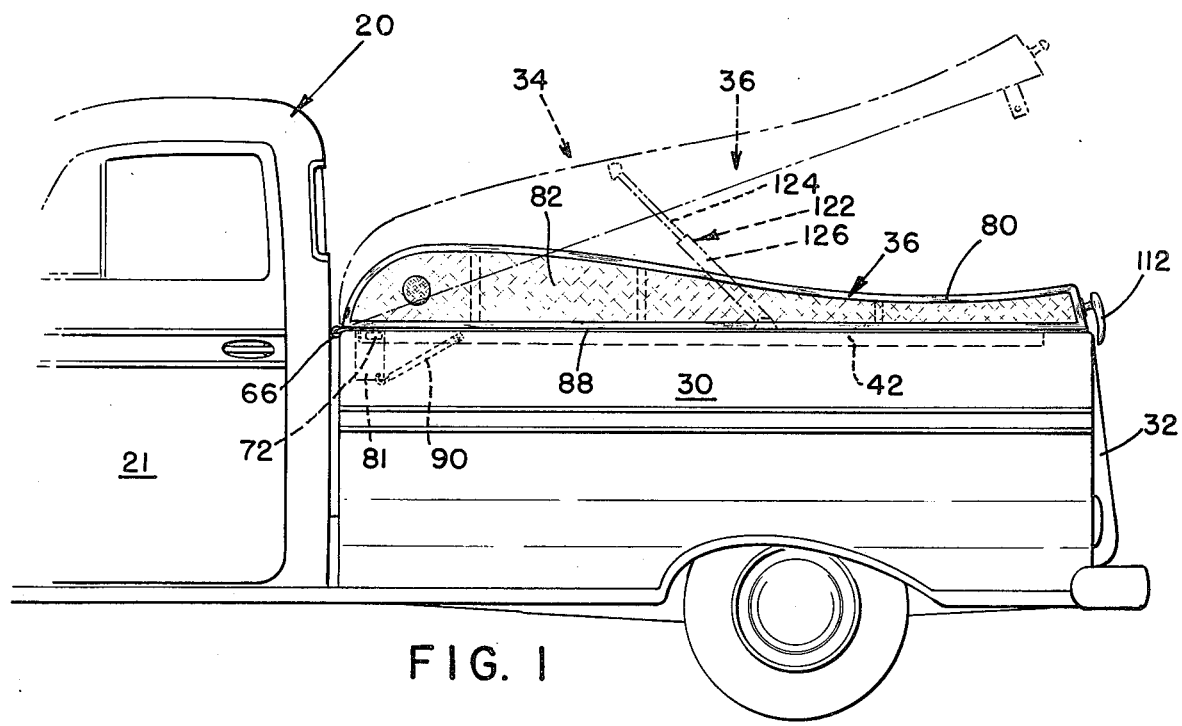
FIG. 1 is a side elevational view of a pickup truck having the cover assembly of the present invention mounted thereon, the cover being shown closed in full lines and open in broken lines.
Figure 2:
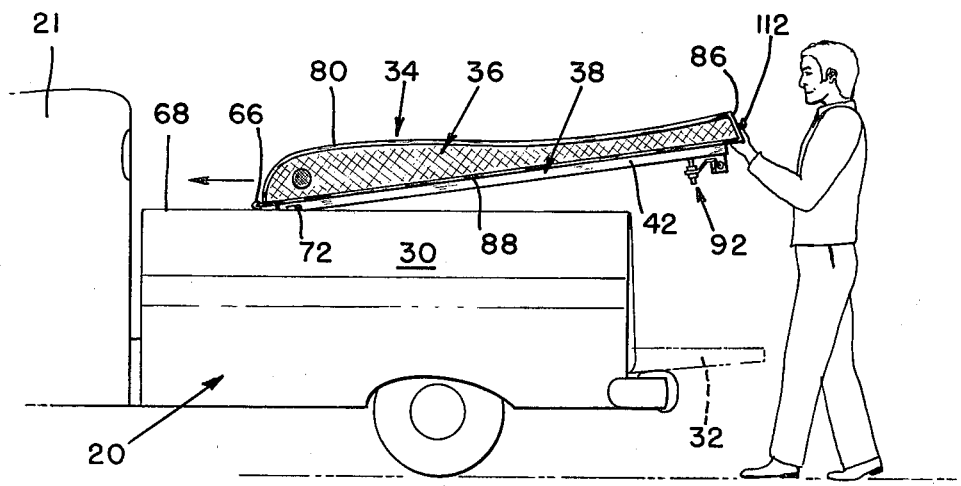
FIG. 2 is a reduced side elevational view of a pickup truck illustrating the positioning of the cover assembly thereon by rolling the forward end of the assembly along the truck bed spaced side walls.
Figure 3:
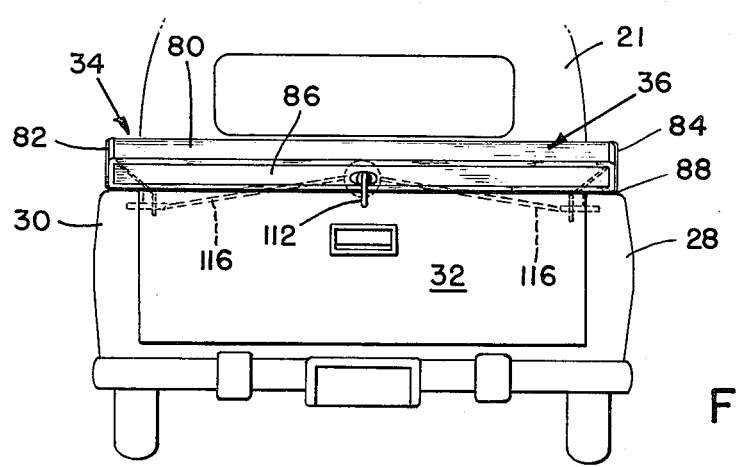
FIG. 3 is a rear elevational view of the cover assembly mounted upon a pickup truck.
Figure 4:
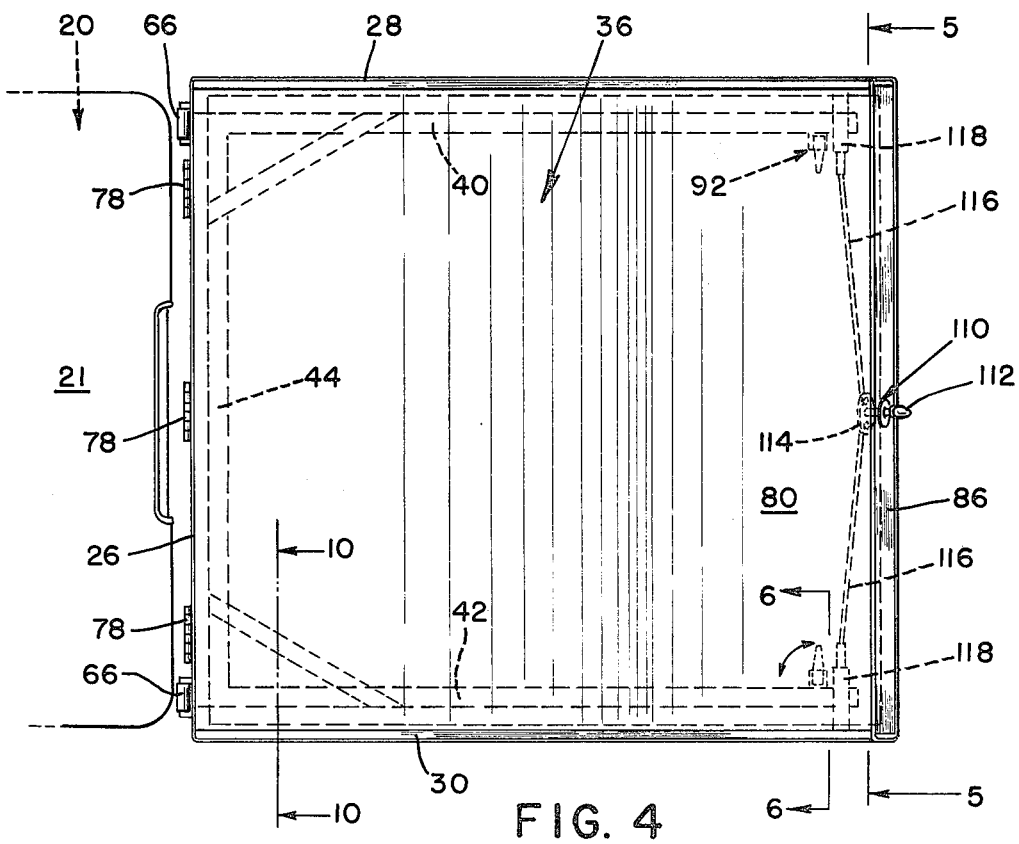
FIG. 4 is a top plan view of the cover assembly mounted upon a truck.

Referring to FIGS. 1–12 of the drawing, reference numeral 20 designates a pickup truck having a cab 21 and a load bed 22 defined by a floor 24, a forward wall 26, spaced side walls 28, 30 and a pivotably mounted tailgate 32. The tailgate 32 is hinged along the bottom edge of the truck frame for pivotable displacement between a vertical, closed position, as shown by FIGS. 1 and 3, and a generally horizontal, opened position as shown in broken lines by FIG. 2.

The truck bed 22 is provided with a lightweight, low profile cover assembly 34 including a cover 36, and a frame assembly means 38. The cover assembly 34 may be fabricated of suitable materials, however, lightweight materials such as aluminum, reinforced glass fibers, plastic, etc. are preferred. The lightweight cover assembly is rigid permitting one individual to place the cover assembly 34 upon a vehicle or remove it therefrom, as shown by FIG. 2, by rolling the forward end of the cover assembly along the truck side walls 28 and 30.

The frame assembly means 38 is generally U-shaped, as shown most clearly by FIGS. 8-12, and includes spaced, generally parallel side members 40, 42 adjustably secured to a forward member 44. The forward member 44 may be generally T-shaped including a first portion 46 supported upon the top of the load bed forward 26, a second portion 48 extending downwardly into the load bed and a third portion 50 for facilitating connection to the side members 40, 42. The outer sides of the forward frame members 44 are provided with rubber, polyurethane foam, or other suitable materials 52, FIG. 9, which yields to prevent scratching or marring of the surface of the forward wall 26 and which seals against the wall 26 to weatherproof the load bed. Each of the parallel side members 40 and 42 consists of an angle member having resilient material 52 applied thereto, as on the forward frame member 44, and including a first portion 54 supported upon the upper surface of one of the side walls 28 or 30 and a second portion 56 which extends downwardly and abuts the inner, upper surface of a side wall.

Rigidly secured to each of the side members 40 and 42 adjacent the forward end is a bar or plate 58 which rests upon the outer ends of portions 50 of the frame forward member 44. The bars or plates 58 define elongated slots 60 aligned with openings in the portion 50 of frame member 44 for receiving the fastener 62. Since the width between the inside upper edge portions of the side walls 28, 30 varies from model to model and manufacturer to manufacturer of the various vehicles, the width of the frame assembly means 38 must be adjustable such that the side members 40, 42 fit snugly against the vehicle side walls. Upon moving the frame side members 40, 42, in the directions of the arrows X, FIG. 12, against the vehicle side walls, the fasteners 62 are tightened. Braces 64 extend between and are fixedly secured to the plates 58 and the frame side members 40, 42.

Rollers 66 and 68 are provided at the forward ends of the frame assembly means 38 to facilitate mounting or removing the cover assembly upon a vehicle. The first pair of rollers 66, 66 are provided at the forward ends of the frame side members 40, 42 for rolling contact with the upper surfaces 68 of the vehicle side walls 28, 30. Each of the rollers 66 is supported by a bracket 70 secured to the forward end of frame side rail 40 or 42. As shown most clearly by FIGS. 1 and 11, when the cover assembly 34 is moved to its forwardmost position, with the frame assembly means 38 abutting the vehicle forward wall 26, the rollers 66 overhang the upper edge of the vehicle forward wall 26.

Figure 11:
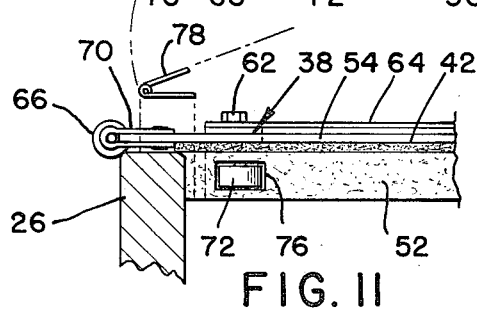
FIG. 11 is a fragmentary, side elevational view of the frame supported upon the vehicle load bed front wall and illustrating the rollers at one side of the cover assembly for facilitating displacement of the cover assembly along a vehicle side wall.
Figure 9:
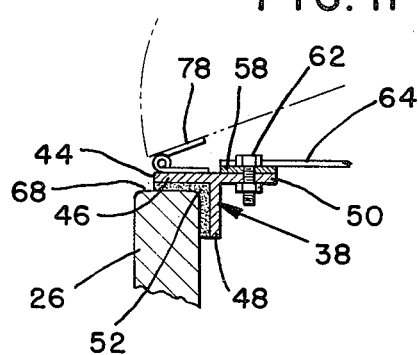
FIG. 9 is a view taken along line 9—9 of FIG. 8 and illustrating a portion of the cover assembly frame.
Figure 12:
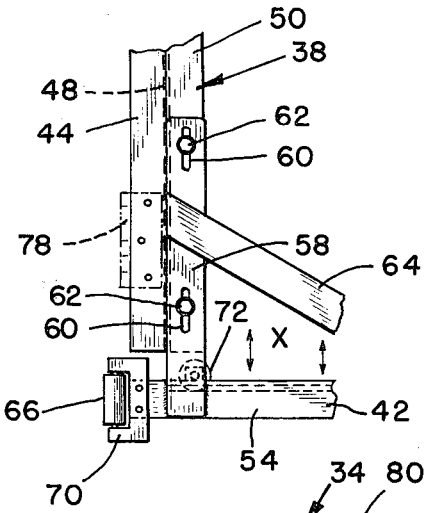
FIG. 12 is a fragmentary top plan view of one forward corner of the frame illustrating the adjustability thereof.
Figure 10:
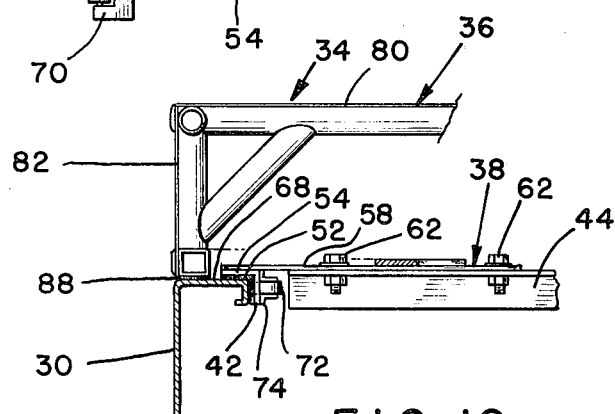
FIG. 10 is a view taken along line 10—10 of FIG. 4 illustrating a portion of the cover and a portion of the frame.

Each of the frame side members 40 and 42 has a roller 72, FIGS. 10-12, secured thereto by means of a bracket 74. The rollers 72 are displaceable about the vertical axes and partially extend through openings 76, FIG. 11, and the side members 40 and 42 and the resilient material 52 such as to be in rolling contact with the upper inner surfaces of the vehicle side walls 28 and 30. The rollers 72 guide and prevent lateral displacement of the cover assembly while being positioned upon or removed from the vehicle.

The cover 36 is pivoted upon the frame 38 by means of hinged fasteners 78 provided at the forward end of the load bed. Preferably the cover 36 is wider than the frame 38 to cover the standard holes or pockets 81 normally provided at spaced intervals along the vehicle side walls 28, 30 for the insertion of the stakes or posts.

The cover includes an upper wall or shell 80, which may be curved, parallel side walls 82, 84 and a rear wall 86. The lower edges of the parallel side walls 82, 84, which rest upon the vehicle side walls 28, 30, are provided with weathertight sealing material 88 which prevents marring of the vehicle side walls.

The cover assembly 34 is retained upon a vehicle by means of rubber tension straps 90 having a hook at each end, such as manufactured by Continental Rubber Works of Erie, Pa., and lift and turn spring loaded latches 92, such as manufactured by Southco Company of Lester, Pennsylvania. Each tension strap 90 has an end attached to a frame side member 40 or 42 and the other end attached to the lower end of a vehicle pocket or standard hole 81, as shown by FIG. 1. A latch 92 is secured to each of the frame side members 40, 42 adjacent the rearward end portions for clamping the frame assembly means 38 to the vehicle side walls 28, 30. Each latch 92 includes a spring biased member 94 having a lever 96 adjustably positioned thereon, a support block 98 and a handle 100 provided with a cam surface 102. Normally when the cover assembly is positioned upon a vehicle the clamps 92 are in the FIG. 7 position. To clamp the cover assembly to a vehicle the handle is rotated to position the lever 96 under the lip of a load bed side wall 28 or 30. The handle 100 then is rotated 90 degrees about pin 104 to the FIG. 6 position thereby urging the lever 96 upwardly and clamping a vehicle side wall. Pins 106, 108 limit rotation of the member 94 and lever 96.

Figure 5:
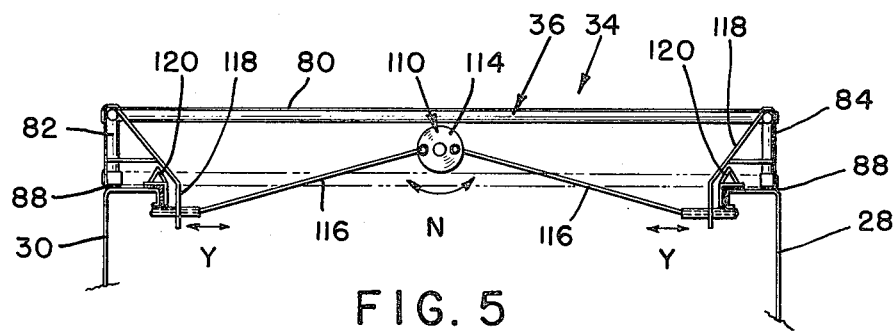
FIG. 5 is a view taken along line 5—5 of FIG. 4 illustrating the mechanism for locking the cover in a closed position.
Figure 6:
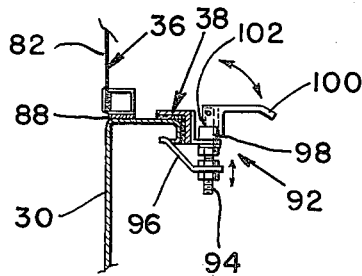
FIG. 6 is a view taken along line 6—6 of FIG. 4 illustrating a clamp for connecting the cover assembly to one of the vehicle side walls.
Figure 7:
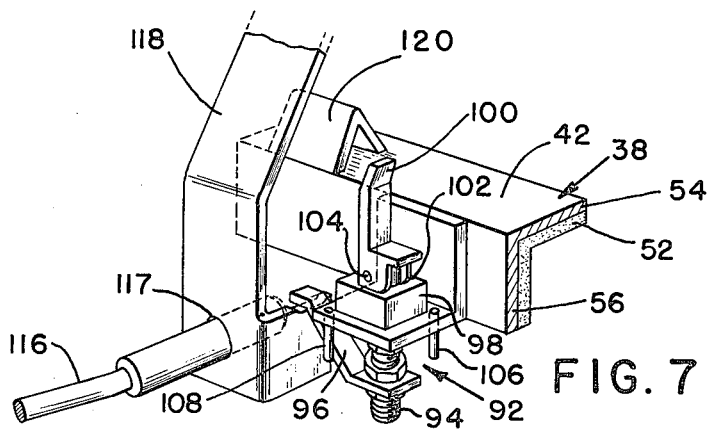
FIG. 7 is an enlarged, perspective view of one rear side portion of the cover assembly illustrating the method of locking the cover to the adjustable frame when mounting the assembly or removing the assembly from a vehicle.
Figure 8:
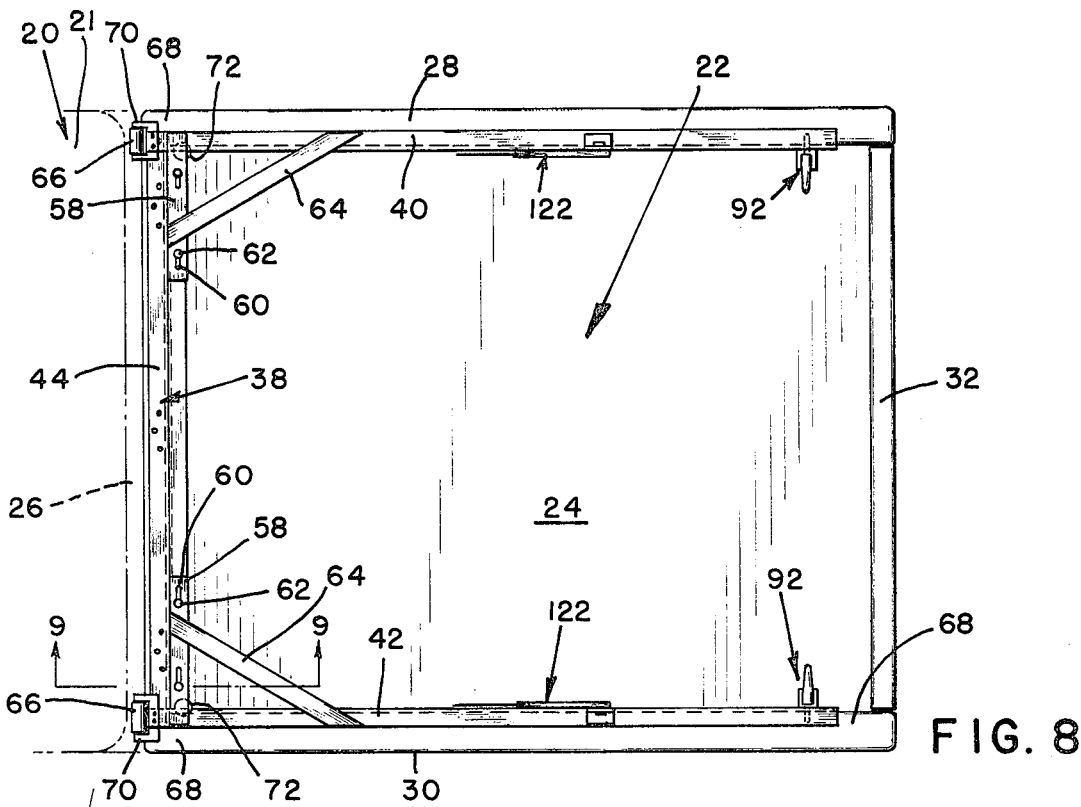
FIG. 8 is a top plan view similar to FIG. 4 with the cover removed and illustrating the adjustable U-shaped frame.

A locking mechanism 110, which is controlled by a handle 112, releasably locks the cover assembly to the vehicle, prevents unauthorized opening of the tailgate 32 and couples the cover 36 and frame 38 together as a unit when displacing the cover assembly 34 relative to the vehicle load bed. The mechanism 110 preferably is operated by a key, and upon actuation of handle 112, disk 114 rotates to displace rods 116 in the directions of the arrows Y, FIG. 5. The outer ends of the rods 116 are supported by and displaceable in openings 117 and members 118 attached to the cover 36. When the handle 112 and disk 114 are rotated to the locked position, the end portions of the rods 116 extend underneath the inturned lip of the vehicle side walls 28, 30, as shown by FIG. 5, thus preventing opening of the cover 36. Further, when in the locked position, the handle 112 extends downardly, as shown by FIG. 3, and overlaps the upper end of the tailgate 32 thereby preventing access to the load bed by opening the tailgate. Striker plates 120 are secured to the frame side members 40, 42 to engage the ends of the rods 116 and urge the rods inwardly of the side members when the cover 36 is closed. The latches 92 may be pivoted to the position of FIG. 7, if desired, such that the end of the lever 96 is positioned adjacent to and above the end portion of a rod 116 to couple the frame means 38 to the cover 36.

Conventional collapsible support braces 122 are provided in each side of the cover assembly for selectively holding the cover 36 in an opened position during loading and unloading. The braces include a pair of telescoping links 124, 126 and a suitable locking mechanism, not shown. The outer end of link 124 is pivotably connected to the cover 36 or the outer end of link 126 is pivotably coupled to a frame side member 40 or 42.

FIGS. 13–17 refer to a modified truck bed cover assembly 34'. The assembly 34' includes a cover 36' having an upper wall or shell 80', parallel side walls, and a rear wall 86', similar to the cover 36 of the embodiment of FIGS. 1–12. The cover 36' also includes an inner support framework 130 which gives rigidity to the shell 80', side walls and rear wall 86'. The lower portions of the cover 36' which are adapted to rest upon the side walls 28, 30 of the truck 20 also are provided with a mar-proof and weathertight sealing material 88'. The width of the cover 36' is sufficient to overlap the standard holes or pockets 81'.

Rollers 132, similar to rollers 66 of the embodiment of FIGS. 1–12, are secured to the forward side portions of the frame 130 of cover 36' by brackets 134 to facilitate mounting the cover assembly upon a vehicle or removal therefrom. Note that the rollers 132, only one of which has been shown, overhangs the upper forward edge of the truck bed front wall 26 when the cover 36' is properly positioned.

Bumper assemblies 136, only one of which has been shown, are provided at the forward corners of the cover 36' to prevent side movement of the cover and facilitating centering of the cover 36' with respect to the vehicle side walls 28, 30. Each bumper assembly 136 includes an L-shaped bracket 138 secured to the cover support framework 130 and a bumper 140 secured to a plate 142 which is adjustable relative to bracket 138 by means of elongated slot 144 and fastener 146. The cover is placed upon and centered relative to the vehicle side walls and the bumpers are moved into abutting relation with the inner portions of the side walls 28, 30, as shown by FIG. 15. When properly positioned the fasteners 146 are tightened to secure the positions of the bumpers 140. The lower portions of the L-shaped brackets 138 are provided with rubber, foam or other suitable material 148, FIG. 16, to prevent the frame 130 from engaging and marring the forward wall 126.

The forward end portion of the cover 36' is retained upon the vehicle by tension straps 90', secured similarly to the straps 90 of the embodiment of FIGS. 1–12.

The rear portion of the cover 36' is retained in the closed position by a frame assembly means, FIGS. 13 and 17, including a frame assembly 150 secured to each of side walls 28 and 30. Each frame assembly 150 includes a relatively short angle member 152 adapted to rest upon the inner upper corner of a side wall 28 or 30, as shown most clearly by FIG. 14. Each frame assembly 150 is releasably and selectively secured to a vehicle side wall 28 or 30 by releasable overcenter type spring latches 154 and 156. The latches are fixedly secured to the angle member 152 and each includes a curved tongue portion, not shown, for lockingly engaging a side wall. The curved tongue portion of latch 154 extends downwardly and engages the inturned lip 158 of a side wall, side wall 28 is shown by FIG. 14. The curved tongue of the latch 156 extends into and engages a portion of a side wall 28 defining the rear standard hole 81', FIG. 17.

Conventional collapsible support braces 122', similar to braces 122 of FIGS. 1–12, are provided for maintaining the cover 36' in the raised position. The outer end of link 124' is pivotably connected to cover 36' while the outer end of link 126' is pivotably secured to an angle member 152.

Each frame assembly 150 is provided with an upstanding, inverted U-shaped member 160 having a striker plate 162 secured thereto for cooperating with locking mechanism 110' similar to the locking mechanism 110 of FIGS. 1–12. Rods 116', operatively connected to a disk and handle, as shown by reference numerals 114 and 112 in the embodiment of FIGS. 1–12, have adjustably attached to the outer end thereof members 164 for cooperating with the U-shaped members 160 and striker plates 162. Each member 164 is directed to member 160 through an opening, not shown, in bracket 166 which, in turn, is secured to framework 130.

The cover assembly 34' may be rolled into position, as shown by FIG. 2, until the rollers 132 are positioned, with respect to the forward wall 26, as shown by FIG. 16. The bumpers 140 are adjustably secured in abutting relation with the inner upper portions of side walls 28, 30. With the cover 36' in the open position, straps 90' and frame assemblies 150 are secured, as shown by FIG. 13. The cover 36' may be locked in a closed position by means of the locking mechanism including a handle which overlaps a portion of the tailgate, as described with respect to the embodiment of FIGS. 1–12.

I claim:

1. A low profile, lightweight cover assembly for a pickup type vehicle having a cargo bed formed by spaced side walls, a forward wall, a tailgate and standard pockets in the upper portion of the side walls, comprising; a cover corresponding substantially in size to the width and length of the vehicle cargo bed, means for permitting pivotable movement of said cover about the cover forward end between opened and closed positions, roller means extending forwardly of said cover for facilitating placement upon and detachment from a vehicle by rolling upon the vehicle side walls, a frame assembly means releasably mounted upon said vehicle without altering the vehicle, wherein said frame assembly means includes a first member supported by the vehicle front wall, spaced side members, and means adjustably positioning said side members relative to said first member for support by the vehicle side walls, and means for releasably, locking said cover to said frame assembly means to prevent access to the cargo bed said releasable locking means including a handle normally overlapping the vehicle tailgate when in locked position to prevent opening of the tailgate, said releasable locking means further including adjustable rod members displaceable into engagement with said frame assembly means to prevent pivoting of said cover, and further including resilient strap tension means for releasably attaching the forward end portion of said cover to the vehicle.

2. A low profile, lightweight cover assembly as recited in claim 1, wherein said roller means includes a pair of spaced rollers, each roller being positioned relative to said cover to engage the side walls during placement of the cover upon or removal from a vehicle, said rollers normally overlapping upper portions of the vehicle forward wall.

3. A low profile, lightweight cover assembly as recited in claim 2, wherein said rollers are secured to the forward portion of said cover.

4. A low profile, lightweight cover assembly as recited in claim 2, wherein said rollers are secured to said frame assembly means.

5. A low profile, lightweight cover assembly as recited in claim 1, wherein said frame assembly means includes a pair of spaced frame assemblies, each frame assembly including latching means for releasably coupling the frame assembly to a vehicle side wall.

6. A low profile, lightweight cover assembly as recited in claim 5, wherein said latching means of each frame assembly includes a pair of latches for releasable securement to a vehicle side wall.

7. A low profile, lightweight cover assembly as recited in claim 1, and further including bumper means adjustably secured to said cover for abutting the vehicle side walls to prevent side movement of the cover.

* * * * *